J. REID.
PISTON RING.
APPLICATION FILED NOV. 26, 1919.
1,405,331.
Patented Jan. 31, 1922.
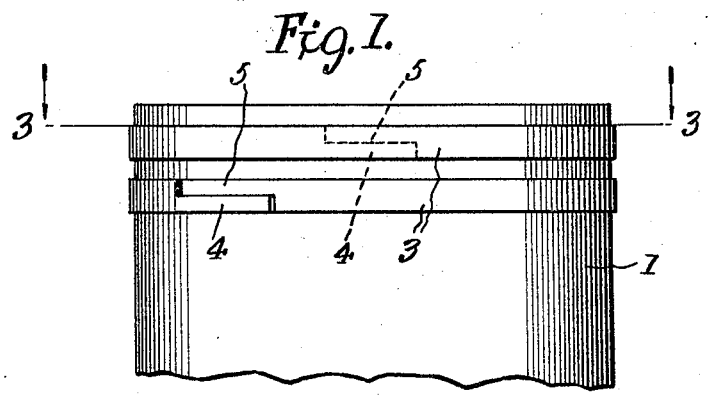
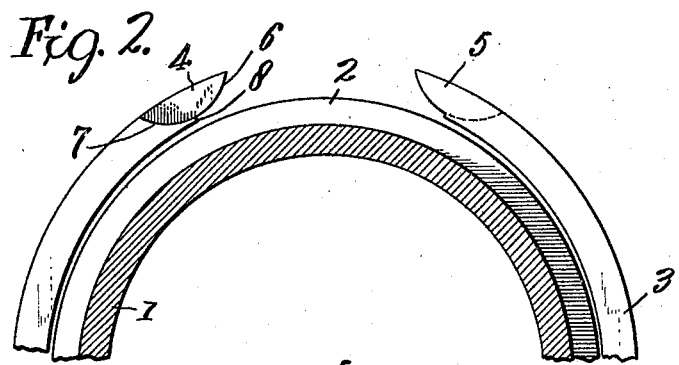
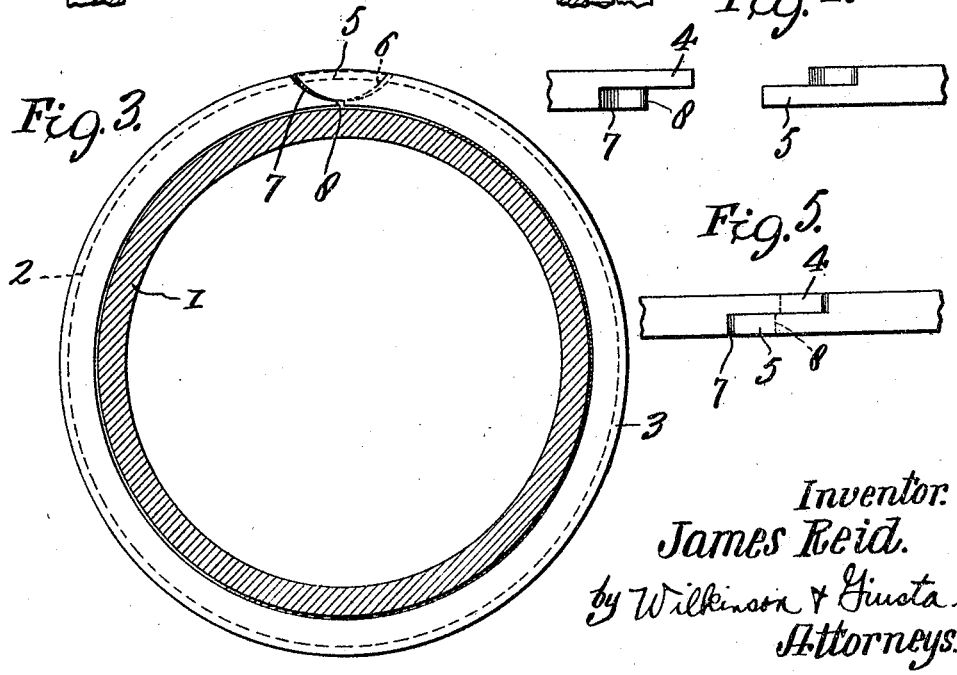
Inventor.
James Reid.
by Wilkinson & Giusta.
Attorneys.

UNITED STATES PATENT OFFICE.

JAMES REID, OF SYRACUSE, NEW YORK.

PISTON RING.

1,405,331.　　　　　Specification of Letters Patent.　　Patented Jan. 31, 1922.

Application filed November 26, 1919. Serial No. 340,713.

*To all whom it may concern:*

Be it known that I, JAMES REID, a citizen of the United States, residing at Syracuse, in the county of Onondaga and State of New York, have invented certain new and useful Improvements in Piston Rings; and I do hereby declare the following to be a full, clear, and exact description of the invention, such as will enable others skilled in the art to which it appertains to make and use the same.

The present invention relates to improvements in piston rings, and it more specifically relates to an improved joint made between the free ends of the split ring.

An object of the present invention is to provide an improved piston ring in which the joint between the free ends of the same forms a more perfect seal against the escape of gases than has been heretofore attained with prior forms of joints.

Another object of the invention is to produce a joint that is more quickly produced and which will be more mechanically uniform and accurate than present forms of joints.

A further object of the present invention lies in providing a joint that will be stronger and more rigid and less likely to sustain breakage than present joints.

In the accompanying drawings forming a part of this application, and in which similar reference symbols indicate corresponding parts in the several views:

Figure 1 is a fragmentary elevational view of a piston head shown equipped with two improved piston rings constructed in accordance with the present invention.

Figure 2 is a fragmentary cross section of the piston with the piston ring sprung out from the groove in the piston.

Figure 3 is a cross sectional view through the piston with the piston ring in place in the groove.

Figure 4 is a fragmentary plan view of the piston ring with the ends separated; and Figure 5 is a similar view with the ends brought together.

Referring more particularly to the drawings, 1 designates a piston having the usual annular groove 2 therein to receive the piston rings 3.

The rings 3 are of the usual piston ring metal and are adapted to be sprung into the grooves 2 and project beyond the outer wall of the piston 1, for the purpose of engaging the interior wall of the cylinder and preventing the escape of gases past the piston.

The present invention lies more particularly in the joint formed between the two split ends of the piston ring 3, and in accordance with this invention the free ends of the ring 3 are cut away partially in offset relation, leaving a tongue 4 on one end and a similar tongue 5 on the other end, these tongues being offset and adapted to overlap when the two ends of the split ring 3 are allowed to come together.

The under sides of the tongues 4 and 5 are rounded off or curved as indicated at 6. Laterally of the tongue 4 the portion cut away is so removed as to leave a ledge 7 also of rounded or curved configuration corresponding to the curvature of the under face 6 of the tongue 5, so that the two match, and when brought together, as indicated in Figure 3, the rounded under face 6 of the tongue 5 fits against the rounded ledge 7.

The forward end of the ledge 7 has a shoulder 8 which extends beneath the under face 6 of the tongue, and the ledges 8 of the opposite ends are adapted to come together when the ring is wholly contracted. Figure 3 shows the ring in a slightly expanded condition.

The curved parts 6 and 7 are very important and secure improved results with a joint of the character above described, and while it is probably not essential that the curvature be the same as is given these parts in the drawings, yet this same curvature, is attended with valuable results.

One particular advantage derived from the curved tongue and ledge follows from the fact that when the ring 3 expands so that the opening of the joint, measured on the outside circumference, exceeds that caused by usual wear; the gap between the tongue and its seat at the inside circumference of the ring is so slight as to still form substantially a leak-proof seal.

The form given the joint also provides for the greatest thickness, or cross section, of the tongues being the parts adjacent the ring so that the tongues are more rigid and less likely to be broken off. Moreover, an exceedingly long lap of the tongues is obtained on the outer diameter or working surface of the piston ring, while on the inner diameter of the ring no lap joint occurs. The long overlapping joint prevents the escape of gases across the face of the ring.

A joint made in this manner will also remain useful even after considerable wear, as the curved faces will tend to cause the two ends of the joint to ride together with greater facility.

The particular form of the ends of the ring is such as to facilitate the placing of the ring on the piston head and to render it easy to move the same to place in the groove 2; while also facilitating the removal of the piston ring from the groove without incurring the likelihood of damaging either the ring or the groove in the piston head.

The ring may very readily be made by removing a section of metal from a one piece ring, which can all be accomplished in two operations.

It is obvious that those skilled in the art may vary the details of construction and arrangements of parts without departing from the spirit of my invention, and therefore I do not wish to be limited to such features, except as may be required by the claim.

I claim:

As an article of manufacture, a split packing ring made of a single piece of resilient metal, having its body portion substantially rectangular in cross section, and having the two ends provided with reversely disposed tongues forming, respectively, the side walls of grooves each in the form of an arc of a circle, the lower face of each tongue being shaped to register with the curve of the opposite groove, and the two ends of the ring being each provided with a shoulder at the base of the corresponding tongue and at the lower end of the corresponding groove, the said shoulders having plane abutting surfaces radial to the circumference of the ring.

JAMES REID.